US009602961B2

(12) United States Patent
Smyrk et al.

(10) Patent No.: US 9,602,961 B2
(45) Date of Patent: Mar. 21, 2017

(54) MONITORING METHOD AND SYSTEM

(71) Applicant: METAROVE PTY LIMITED, Milsons Point, New South Wales (AU)

(72) Inventors: Martin Smyrk, Wollstonecraft (AU); Allan Richards, Crows Nest (AU)

(73) Assignee: METAROVE PTY LIMITED, Milsons Point, New South Wales (AU)

( * ) Notice: Subject to any disclaimer, the term of this patent is extended or adjusted under 35 U.S.C. 154(b) by 0 days.

(21) Appl. No.: 14/439,542

(22) PCT Filed: Nov. 1, 2013

(86) PCT No.: PCT/AU2013/001265
§ 371 (c)(1),
(2) Date: Apr. 29, 2015

(87) PCT Pub. No.: WO2014/066948
PCT Pub. Date: May 8, 2014

(65) Prior Publication Data
US 2015/0296334 A1 Oct. 15, 2015

(30) Foreign Application Priority Data
Nov. 1, 2012 (AU) .............................. 2012904817

(51) Int. Cl.
*H04W 24/00* (2009.01)
*H04W 4/02* (2009.01)
(Continued)

(52) U.S. Cl.
CPC .............. *H04W 4/02* (2013.01); *G06Q 10/08* (2013.01); *G06Q 50/30* (2013.01); *H04W 8/02* (2013.01)

(58) Field of Classification Search
CPC . G07C 5/008; G07C 5/00; G07C 5/02; G07C 5/085; G07C 9/00; G08G 1/20;
(Continued)

(56) References Cited

U.S. PATENT DOCUMENTS

2009/0163226 A1* 6/2009 Karkaria ........... H04M 1/72572
455/456.1
2010/0144375 A1 6/2010 Pfister et al.
(Continued)

OTHER PUBLICATIONS

International Search Report mailed Nov. 26, 2013 in International Patent Application No. PCT/AU2013/001265 filed Nov. 1, 2013.

*Primary Examiner* — Olumide T Ajibade Akonai
(74) *Attorney, Agent, or Firm* — Knobbe Martens Olson & Bear LLP

(57) ABSTRACT

An electronic monitoring system and method for monitoring one or more transport services, wherein for each one of one or more portable electronic devices, data of the portable electronic device indicative of the location of the portable electronic device is monitored and the location data stored in a memory of the portable electronic device. Each device monitors for a boarding trigger event indicative of a user carrying the portable electronic device boarding a transport service, and upon a boarding trigger event occurring, communicates monitoring data to a remote monitoring system, the monitoring data including at least time data of the boarding trigger event and data indicative of the location of the portable electronic device. The remote monitoring system monitors one or more transport services using data communicated by the portable electronic devices.

16 Claims, 6 Drawing Sheets

(51) Int. Cl.
*G06Q 50/30* (2012.01)
*G06Q 10/08* (2012.01)
*H04W 8/02* (2009.01)

(58) Field of Classification Search
CPC .. G08G 1/205; G08G 1/0129; G06Q 10/0833;
G06Q 30/0267; G06Q 50/30; H04W
4/021; H04W 64/00; H04W 4/02; H04W
8/02; G01C 21/34; G01C 21/3415; G01C
21/3676; G01S 5/0018; G01S 5/0009
USPC .......................................... 455/456.1–456.6
See application file for complete search history.

(56) References Cited

U.S. PATENT DOCUMENTS

| | | | |
|---|---|---|---|
| 2010/0197325 A1* | 8/2010 | Dredge | H04L 67/18 455/456.3 |
| 2011/0060600 A1 | 3/2011 | Fox et al. | |
| 2012/0078497 A1* | 3/2012 | Burke, Jr. | G08G 1/0104 701/300 |
| 2012/0115473 A1* | 5/2012 | Kho | H04W 4/20 455/435.1 |

\* cited by examiner

MONITORING METHOD AND SYSTEM

FIELD

The present invention relates to a monitoring system that employs methods for monitoring one or more transport systems, identifying a transport service, and inferring a boarding event. The invention also provides a portable electronic device for implementing all or part of the above methods as well as computer program code for implementing the above methods as a client or server side application or both.

BACKGROUND

It can be difficult for public transport users to know when a transport service (such as a train or bus) will arrive. Traditionally transport service operators have published timetables and more recently such timetables have become more widely available, for example via websites or applications that can be downloaded onto smart phones. However, there is no guarantee that the relevant transport service will be on time.

More recently, some transport service operators have begun using GPS data to track their fleets, however, such data is often not provided to end users or is only published using digital signs at stops or stations. Such real-time information is often not available at all stops and stations and even where real-time data is published at a stop or station, the information the user wants may not be visible (for example only the next train may be shown).

Further where there are multiple transport service operators as is often the case in large cities, their data may not be integrated.

Accordingly, there is a need for an alternative technique for capturing real-time transport data.

Solutions have been proposed which rely on GPS information retrieved from smart phones, however, typically the GPS sensor consumes a lot of power and can hence have a significant impact on the between charge battery life of a smart phone. Accordingly, there is also a need for an alternative monitoring technique.

SUMMARY

In a first aspect, the invention provides an electronic monitoring method for monitoring one or more transport services, the method comprising:
for each one of one or more portable electronic devices:
monitoring data of the portable electronic device indicative of the location of the portable electronic device and storing the location data in a memory of the portable electronic device;
monitoring for a boarding trigger event indicative of a user carrying the portable electronic device boarding a transport service; and
upon a boarding trigger event occurring, communicating monitoring data to a remote monitoring system, the monitoring data including at least time data of the boarding trigger event and data indicative of the location of the portable electronic device; and
monitoring one or more transport services by the remote monitoring system using data communicated by each portable electronic device.

In an embodiment monitoring data is communicated by a portable electronic device in response to a request from the remote monitoring system.

Some embodiments further comprise the remote monitoring system identifying a transport service boarded by a user. This may comprise inferring the location of one transport services based on data communicated by portable electronic devices identified as being on the transport services.

In an embodiment identifying a transport service boarded by a user comprises the steps of:
identifying, in response to a portable electronic device communicating data indicating a triggering event, a plurality of candidate transport services based on the location and time data for the triggering event and assigning a likelihood score to each candidate transport service;
receiving additional monitoring data from the portable electronic device; and
updating the likelihood score of each candidate transport service based on the additional monitoring data.

In an embodiment, the method comprises generating the likelihood score based on at least one of:
a published schedule;
a modified schedule based on performance of the transit service relative to the published schedule; and
real-time transport service location data.

In an embodiment, the method comprises generating the likelihood score based on a location of the transport service inferred from monitoring data obtained from another portable electronic device of another user.

In an embodiment, the method comprises generating the likelihood score based on a user profile corresponding to the user of the electronic device.

In an embodiment, the method comprises generating the likelihood score by comparing at least one sensor signal of the portable electronic device to a movement profile for each candidate transport service.

In an embodiment, the method further comprises generating transport schedule data at the remote monitoring system based on the communicated monitoring data.

In an embodiment of the method generating transport schedule data comprises the steps of:
comparing the inferred location of a transport service with transport service schedule data; and
modifying the transport service schedule data based on any difference between the transport service schedule data and inferred location data to produce modified schedule data.

In an embodiment the modified schedule data is further modified to take into account any known real time location data and any relevant known traffic conditions effects.

In some embodiments, the method further comprises the steps of:
providing trip planning information by the remote monitoring system in response to a trip plan request from a user, wherein the trip planning information comprises template itinerary data and trip timing data which is applied to the template itinerary data to provide a complete trip plan; and
updating the trip timing data based on real time data.

In some embodiments, the step of monitoring for a boarding trigger event includes inferring a boarding event using the steps of:
comparing an output signal from an accelerometer of a portable electronic device with at least two movement profiles, one of the movement profiles corresponding to a user movement profile and another of the movement profiles corresponding to a form of transport available at the boarding location; and upon the output signal matching a movement profile of a form of transport, communicating data indicative of a boarding event having occurred to a remote monitoring system.

In an embodiment, the method comprises determining whether the user input to the portable electronic device prior to the candidate boarding event is indicative of a boarding event.

In an embodiment, the method comprises comparing the output signal of the accelerometer prior to the candidate boarding event to at least one user movement profile.

In an embodiment each portable electronic device is configured to monitor for a boarding trigger event in a first monitoring state in which monitoring data is stored in memory of the portable electronic device, and upon a boarding trigger event occurring, entering a second monitoring state in which data is communicated to a remote monitoring system.

In an embodiment the method further comprises passing control of data monitoring at the portable electronic device to the remote monitoring system upon the boarding trigger event occurring so that data monitoring in the second monitoring state is performed under the control of the remote monitoring system.

In an embodiment, the method comprises monitoring data in a third monitoring state when a default monitoring condition is met, data indicative of the location of the portable electronic device being sampled less frequently in the third monitoring state than in the first monitoring state and stored in the memory of the portable electronic device.

In an embodiment, the method comprises:
  comparing the location data to location data of one or more transport boarding locations; and
  upon a proximity condition being satisfied with respect to the one or more transport boarding locations, transitioning to the first monitoring state.

In an embodiment, the method comprises transitioning to a fourth monitoring state responsive to determining that the portable electronic device has been stationary for a time period.

In an embodiment, the method comprises transitioning from the fourth monitoring state to a third state responsive to a signal from an accelerometer indicating that the portable electronic device has been moved.

In an embodiment, the method comprises altering a sampling rate responsive to a determined user behaviour.

In an embodiment the user behaviour comprises a current user activity determined based on the user's interaction with the portable electronic device In an embodiment the user behaviour comprises a past user activity based on one or more past travel events of the user.

In an embodiment the user behaviour comprises a past user activity based on one or more past behaviours of a plurality of users.

In a second aspect, the invention provides a monitoring system for monitoring one or more transport services comprising:
  a remote monitoring system; and
  at least one portable electronic device arranged to:
    monitor data in an first monitoring state in which data of a portable electronic device indicative of the location of the portable electronic device is stored in a memory of the portable electronic device;
    monitor for a boarding trigger event indicative of the user boarding a transport service; and
    upon a boarding trigger event occurring, enter a second monitoring state in which data indicative of the location of the portable electronic device is communicated to the remote monitoring system.

In a third aspect, the invention provides a portable electronic device comprising:
  a communication module;
  a data monitor arranged to monitor data of a portable electronic device indicative of the location of the portable electronic device is stored in a memory of the portable electronic device and in response to a boarding triggering event communicate data indicative of the location of the portable electronic device to a remote monitoring system via the communication module; and
  a trigger event monitor arranged to monitor for a boarding trigger event indicative of a user of the portable electronic device boarding a transport service and to control the data monitor to communicate with the remote monitoring system upon determining that a boarding trigger event has occurred.

In an embodiment the portable electronic device further comprises:
  an accelerometer having an output signal;
  a memory storing at least two movement profiles, one of the movement profiles corresponding to a user movement profile and another of the movement profiles corresponding to a form of transport available at the boarding location;
  an accelerometer output comparer arranged to compare the output signal from the accelerometer with the at least two movement profiles and upon the output signal matching a movement profile of a form of transport cause the communication module to communicate data indicative of a boarding event having occurred to a remote monitoring system.

In a fourth aspect, the invention provides a monitoring system for identifying a transport service boarded by a user, the monitoring system arranged to:
  receive monitoring data from a portable electronic device, the monitoring data including at least location and time data of a boarding event detected by the portable electronic device, the boarding event being indicative of the user boarding a transport service;
  identify a plurality of candidate transport services based on the location and time data and assigning a likelihood score to each candidate transport service;
  receive additional monitoring data from the portable electronic device; and
  update the likelihood score of each candidate transport service based on the additional monitoring data.

In a fifth aspect, the invention provides a monitoring system for identifying a transport service boarded by a user, the monitoring system comprising:
  a communication module adapted to receive first monitoring data from a portable electronic device and to subsequently receive second monitoring data, the first monitoring data including at least location and time data of a boarding event detected by the portable electronic device, the boarding event being indicative of the user boarding a transport service;
  a candidate identifier arranged to identify a plurality of candidate transport services based on the location and time data;
  a likelihood assigner arranged to assign a likelihood score to each candidate transport service and to update the likelihood score of each candidate transport service based on the second monitoring data.

The invention also provides computer program code which when executed by a computer implements one or more of the above methods. The computer program code may be provided on a tangible computer readable medium.

BRIEF DESCRIPTION OF DRAWINGS

An exemplary embodiment of the invention will now be described with reference to the accompanying drawings in which.

DETAILED DESCRIPTION

Figure 1:
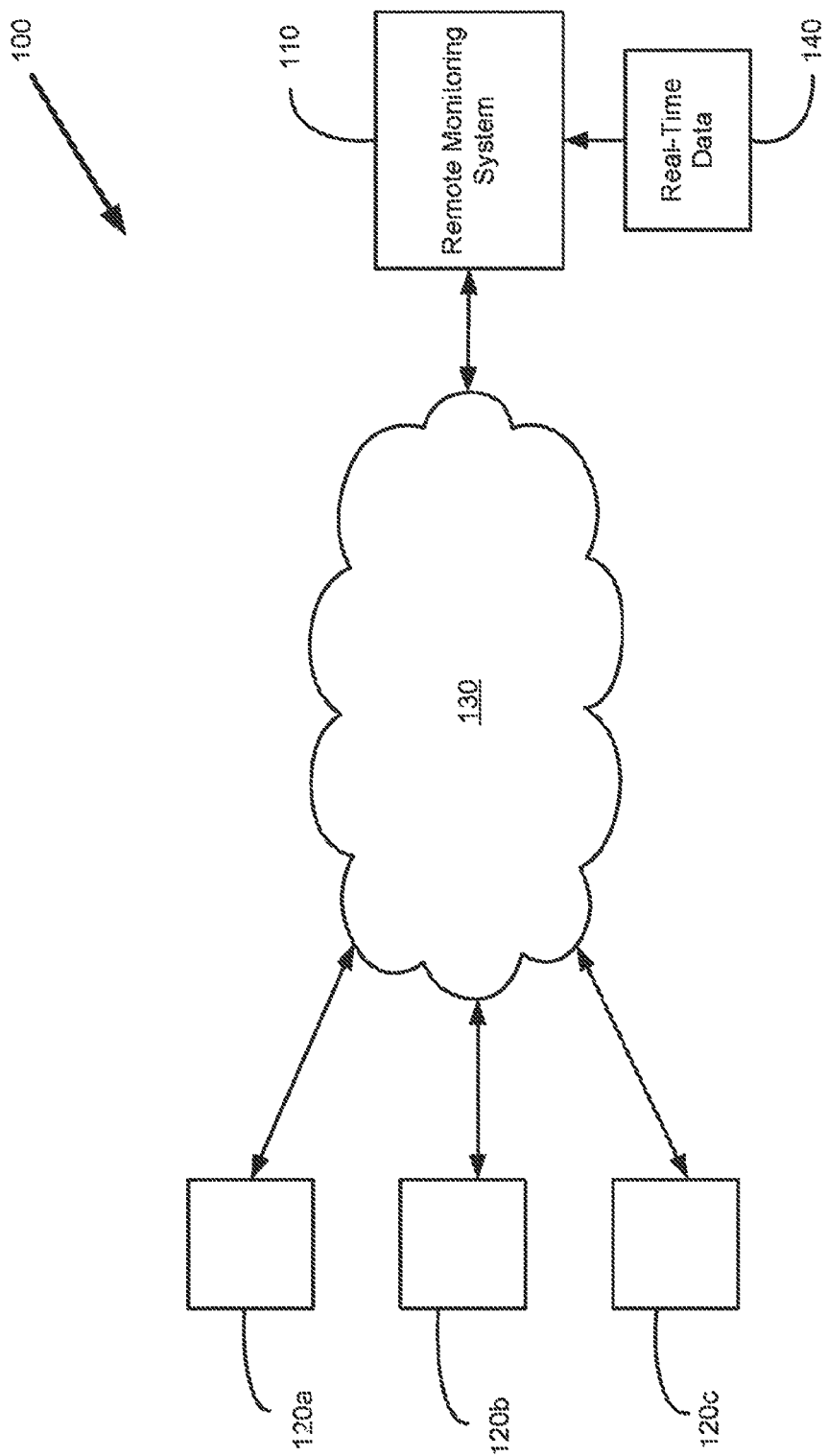
FIG. 1 is a schematic diagram of a monitoring system of an embodiment of an invention.

Referring to the drawings, there is shown a monitoring system for monitoring one or more transport services such as buses, trains, trams or ferries.

FIG. 1 illustrates the general configuration of a monitoring system 100 and shows that a remote monitoring system 110 communicates with a plurality of portable electronic devices 120A to 120C over a network such as the Internet 130. While three devices 120 are shown persons skilled in the art will appreciate that this is purely for illustrative purposes. Each of the portable electronic devices 120 runs a client application that is configured to monitor data indicative of the use of transport services by the users of the respective portable electronic devices. The remote monitoring system 110 processes the monitoring data obtained from the portable electronic devices 120. The remote monitoring system can infer information regarding the public transport services being used by the users of the remote monitoring devices from the monitoring data, for example real time locations of vehicles, travel times, identify congestion etc.

In some embodiments the remote monitoring system 110 can also be arranged to provide information about transport services to respective ones of the portable electronic devices that is based on monitoring data from other portable electronic devices.

In some embodiments, the remote monitoring system 110 may incorporate real-time data from one or more service providers. In FIG. 1, the real-time data is shown as a direct input into remote monitoring system 110 but persons skilled in the art will appreciate that it could also be transmitted over a network 130.

Figure 2:
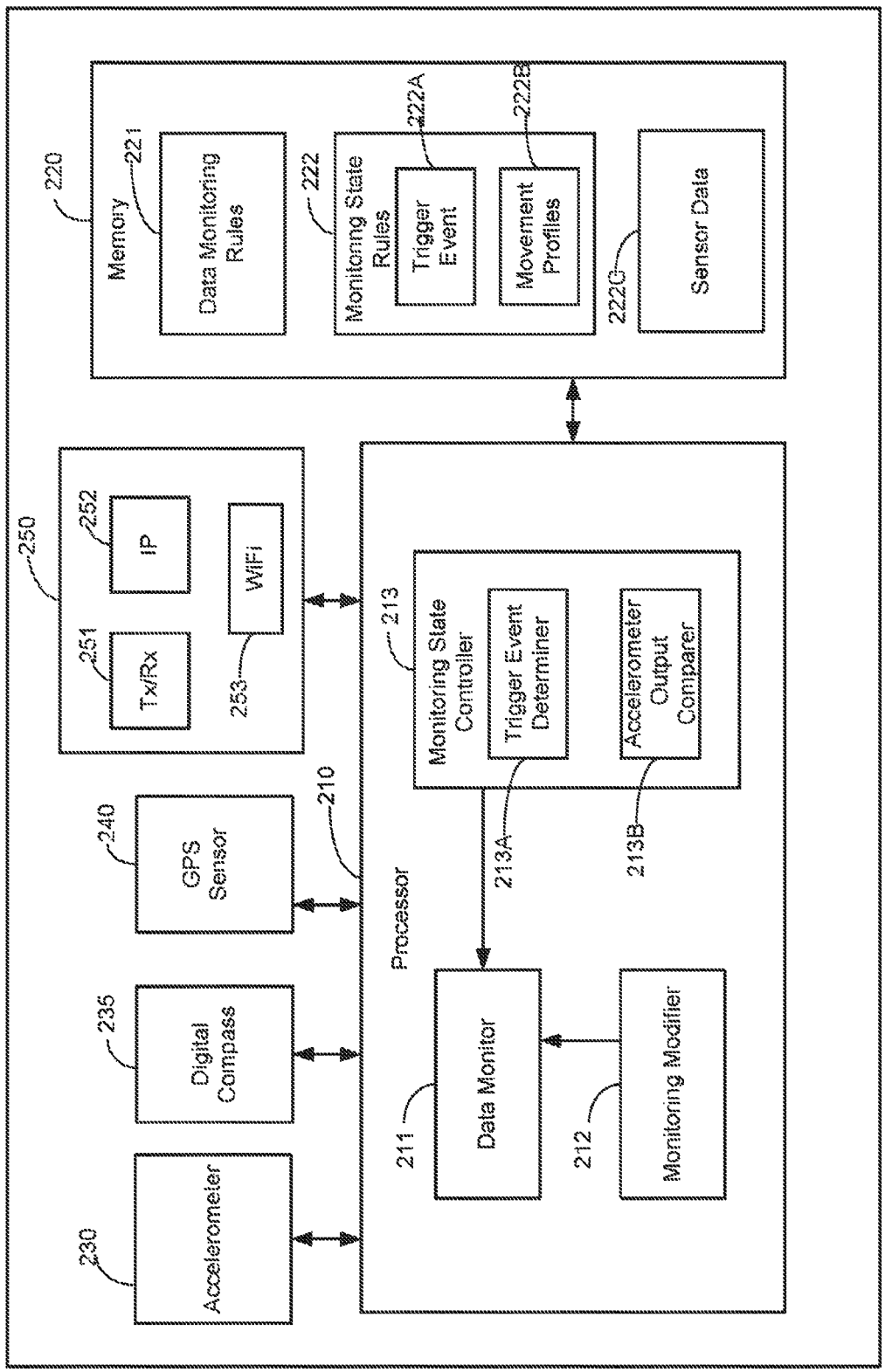
FIG. 2 is a block diagram of a portable electronic device of an embodiment of the invention.

Referring to FIG. 2, there is shown a block diagram of portable electronic device 120 of an embodiment. In the embodiment, the portable electronic device is a conventional smart phone running a tailored client application that takes advantage of a number of modules that are typically supplied with a smart phone. However, persons skilled in the art will appreciate that in certain embodiments, a dedicated hardware circuit could be provided within the device for carrying out one or more of the software functions. For example, one of the features that will be described in detail below involves comparing the output of an accelerometer to one or more movement profiles. In the embodiment this is performed by the accelerometer output comparer 213B based on movement profiles 222B, however, such a feature could be incorporated into the accelerometer 230 by being implemented by a microcontroller of the accelerometer 230 and hence provided as an output to the processor 210 rather than being determined by the output comparer 213B instantiated by the processor.

In any event, the portable electronic device includes a processor 210, memory 220, an accelerometer 230, a digital compass 235, a GPS sensor 240 and a communication module 250. The communication module includes a transmitter and receiver circuit 251 for communicating over the air using a mobile telephone communication protocol such as a 3G or 4G protocol, a data communication circuit 252 and a Wi-Fi circuit 253 for communicating with a local area wireless network. Persons skilled in the art will appreciate that the communication module 250 may incorporate other communications circuits such as Bluetooth and near field communication. Persons skilled in the art will appreciate that the device 120 will also have other components such as a display and one or more input devices which are left out in order to simplify the block diagram of FIG. 2.

In FIG. 2, the processor is shown as implementing a number of modules 211, 212 and 213 to provide the client application based on data stored in memory 220. The processor instantiates a data monitor module 211 that gathers data in one of a number of different modes as will be described in further detail below. Data from the sensors (i.e. accelerometer 230, digital compass 235, GPS sensor 240) gathered by the data monitor 211 is stored as sensor data 222C in at least some monitoring states. It should be appreciated that data may be gathered selectively from the different sensors, for example the GPS sensor may be used only in specific states, used only periodically or not used at all in order to conserve battery. Sensor data may also include data from the communication module 250, for example, network cell location data and signal strength, available WiFi hotspots etc.

A monitoring state controller 213 controls the mode in which the data monitor 211 operates and in particular that amount, type and frequency at which data is gathered. In at least one monitoring state, the remote monitoring system 110, may alter the standard data gathering profile for a state, for example to increase a sampling rate and to this end the processor instantiates a monitoring modifier 212 that is arranged to communicate via the communication module 250 with the remote monitoring system 212 to control the data monitor 211. In some embodiments, the monitoring modifier 212 also acts if defined local criteria are met.

As indicated above, the data monitor 211 monitors in accordance with a number of different states and the different sensors to be monitored and data to be gathered in each of these states is defined data monitoring rules 221. To enable the monitoring state controller to change the state, there are set of monitoring state rules 222 which are implemented by the monitoring state controller. By way of example, there is a trigger event determiner 213A that may determine a change of state based on trigger event rules 222A. A specific example of a change of state rule that can feed into a trigger event is embodied by the accelerometer output comparer 213B that compares the output of the accelerometer to several movement profiles 222B in order to provide an input to changing of the state. Indeed, in some embodiments, this comparison alone may be sufficient to trigger a change in state. For example, identification of a change from the phone being stationary to moving based on the accelerometer output. The amount of communication (if any) between the user device and the remote monitoring system can also vary between states and can also be defined in monitoring state rules.

Figure 3:
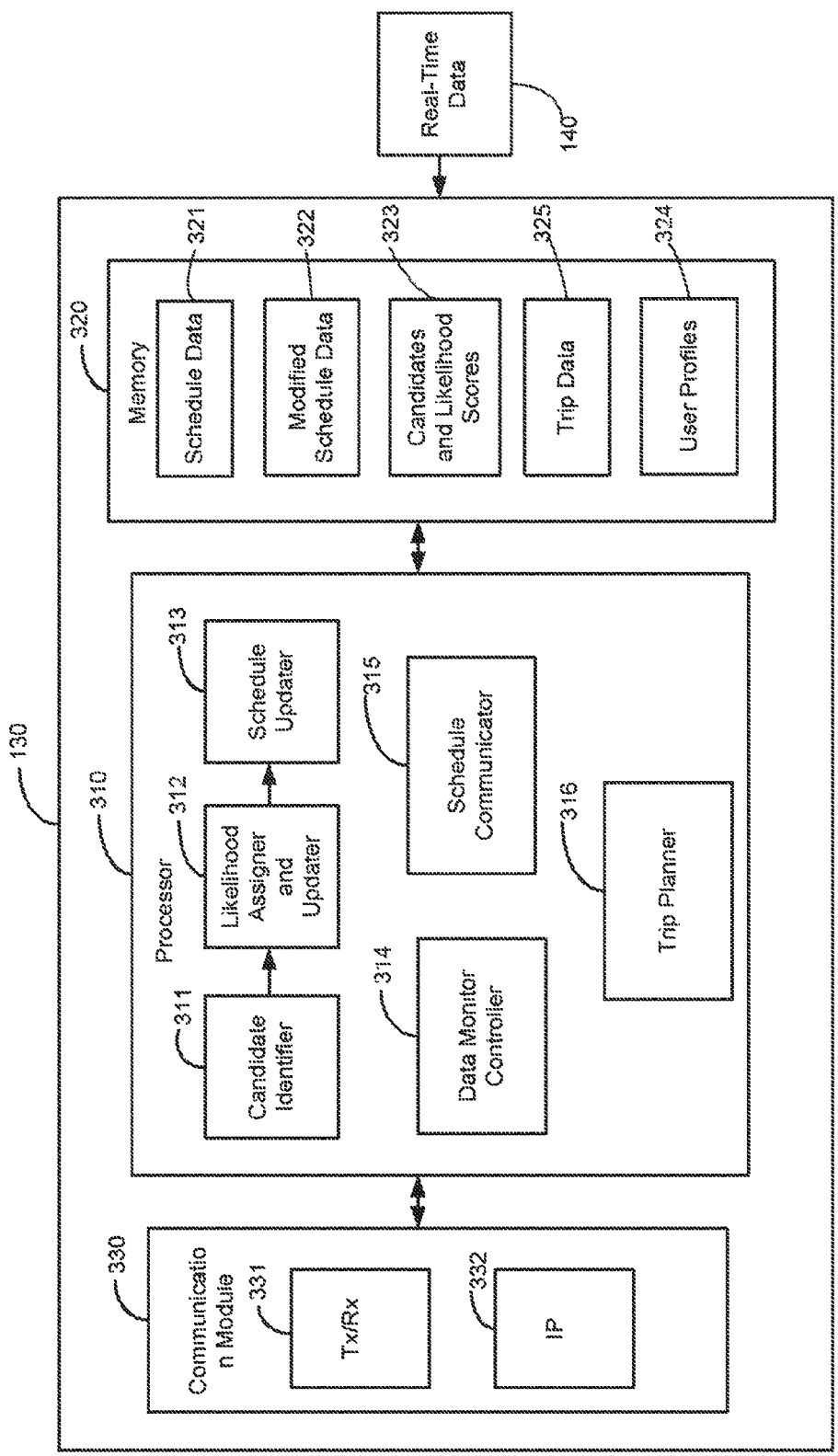
FIG. 3 is a block diagram of a remote monitoring system of an embodiment.

FIG. 3 shows a block diagram of the remote monitoring system 110. The remote monitoring system incorporates a processor 310, a memory 320 and a communication module 330 which is shown including both a transmitter and receiver circuit 331 and a data communication circuit 332. However, persons skilled in the art will appreciate that the communication module of the remote server is more likely to use a data communication circuit 332. The remote monitoring system it typically provided by a server computer running a server application to instantiate a number of modules. These are a candidate identifier 311, a likelihood assignor and updater 312, a schedule updater 313 and a data monitor controller 314. Embodiments can also include one or more of a schedule communicator 315 and a trip planner 316. The function of each of these elements will be described in further detail below. The memory stores schedule data for a number of transport services 321, modified scheduled data 322 created by schedule updater 313 based on the monitored data, likelihood scores 323 which are maintained for candidate transport services, trip data 325 and user profiles 324 which can be used in the generation of the likelihood scores by the likelihood assignor and updater 312 as described in further detail below. In some embodiments the modified scheduled data 322 created by schedule updater 313 based on the monitored data can be communicated to portable electronic devices by schedule communicator 315.

In general, in use of the above monitoring system 100, an application is downloaded and installed onto a mobile phone 120. The application is intended to run as a background process that can communicate with the remote monitoring system 110, in particular to communicate monitoring data.

In some embodiments the application is arranged so that the user can access data stored by the remote monitoring system 110 such as timetable information 321, trip planning data 325 or, modified schedule information 322 which may, for example, indicate the actual location of a service relative to the user and provide an estimated arrival time of the service. The type and amount of data made available for users to access may vary between embodiments. There may be embodiments of the system implemented where users do not access transit data at all, for example the application may be linked to or embedded in a game or activity tracker where the users' movements are monitored and use of public transport is identified but the users do not actually receive any transit data in return. For example, a carbon footprint tracking application may identify whether the user is walking, cycling, driving a car, riding a motorbike or taking public transport and allocate footprint points accordingly. In another example the application may be embedded in a game where points are awarded for catching obscure public transport but the user may receive little or no actual public transport information. In other embodiments obtaining information from the remote monitoring system 110 can be a key feature of the application, for example a public transport application that provides timetable information, trip planning functionality or real time arrival information.

The background process is arranged to run persistently in the background on the user's phone 120 and keeps track of the user's location using a number of sensors available from the device 120.

To reduce power consumption, the types of sensors used and rate of monitoring by the background services are varied as will be described in further detail below. This has the advantage of reducing the impact on battery life and hence increasing the likelihood that users who will participate in the gathering of monitoring data will adopt the service. That is, there would be a risk of low uptake, and hence a small sample size if the application consumed too much power, such as would be required by constant use of the GPS sensor with a rapid sampling rate.

The data monitor monitors for potential transport service boarding events that are communicated to the remote monitoring system 110 which generates a prioritised list of candidates of transport services that the user might have boarded. If the highest scoring candidate transport service is above a threshold, then the remote monitoring system 110 infers that the user has boarded the transport service. In the embodiment, the remote monitoring system 110 continues to update scores of candidate services as the user continues their journey as more evidence may change the identified transit service.

If the highest scoring candidate transport service is below another threshold, then the system 110 infers that the user has not in fact boarded the transport service and instructs the portable electronic device 120 to change monitoring state in order to resume monitoring for potential boarding events.

From the monitoring data that is gathered, a modified schedule 322 can be generated indicating actual locations of the transport service so that other users further along the route can determine the location of the transport service and the time at which it will reach their location. The data also enables a number of other features such as user profiling in order to tailor the user interface of the application without user intervention based on the regularity with which the user rides various transit services, route profiling which enables prediction of the preferred form of transport in the future, and path profiling. For example, if transport services are following a common path such as a major arterial road, information from one transport service can be used to infer arrival times of other transport services that share the common path.

As indicated in FIG. 2, mobile devices such as mobile telephones typically have a number of location sensors. The most common examples include:

Accelerometer 230 senses movement of the phone. In combination with the digital compass 240 the speed and direction of movement of the phone can be determined. Accelerometer 230 and digital compass 235 data can be integrated to estimate changes to the user's location. Thus the movement of the phone relative to a last known position can be used to monitor the location, a technique often referred to a "dead reckoning". Using this technique, the accuracy of the estimate typically deteriorates over time, but power consumption can be considerably lower than constantly sampling the GPS sensor or polling other location sources. The accelerometer is an internal device to the phone and does not require any transmission or reception of signals and therefore, monitoring location/movement using the accelerometer has relatively low power consumption. The accelerometer 230 output can also be used to infer a type of motion, for example walking, stepping up or travelling in a vehicle.

GPS sensor 240 can be used to get more accurate location readings (often down to a few meters), but it takes quite a bit of power, and can take tens of seconds to "spin up". GPS also reports an approximate velocity.

The cell radio (Tx/Rx 251) can be used to get a rough location (usually to within a few hundred meters or a couple of kilometers). The cell radio 251 typically needs to be on anyway so taking these readings takes very little power.

The 802.11 (Wi-Fi) radio 253 can be used in conjunction with remote third-party transit services to get fairly accurate locations indoors or in built-up areas where GPS signals may be blocked or susceptible to reflection. Unique identifiers broadcast by nearby 802.11 routers can be sent to a remote server, and a location is returned. Again, it can take quite a bit of power to communicate with the remote server though, and requires that the phone's Wi-Fi radio to be on.

Most sensors that report locations also report an approximate accuracy radius. In the case of GPS 240, this is a variable attribute, and can be used to get an idea of the signal strength. The client application of device 120 is arranged to periodically, request a list of nearby transit stops e.g. within a 5 km radius from the user device and can store this locally. This is only updated when the user moves significantly, e.g., 2 kms. The client can also request and store some profile data about the current user which may be used as an input to modifying monitoring.

As indicated above, a background process in the form of monitoring state controller 213 on the phone 120 keeps track of the user's activity state. The various states modify the frequency with which the phone's sensors are polled, and the persistence of collected samples. As a user gets closer to boarding a transit service, the polling frequency can increase under control of the monitoring state controller 213 until they're suspected to have boarded a vehicle, at which point the most recent location samples 222C will be sent by the data monitor 211 to the remote monitoring system 120.

Figure 4:
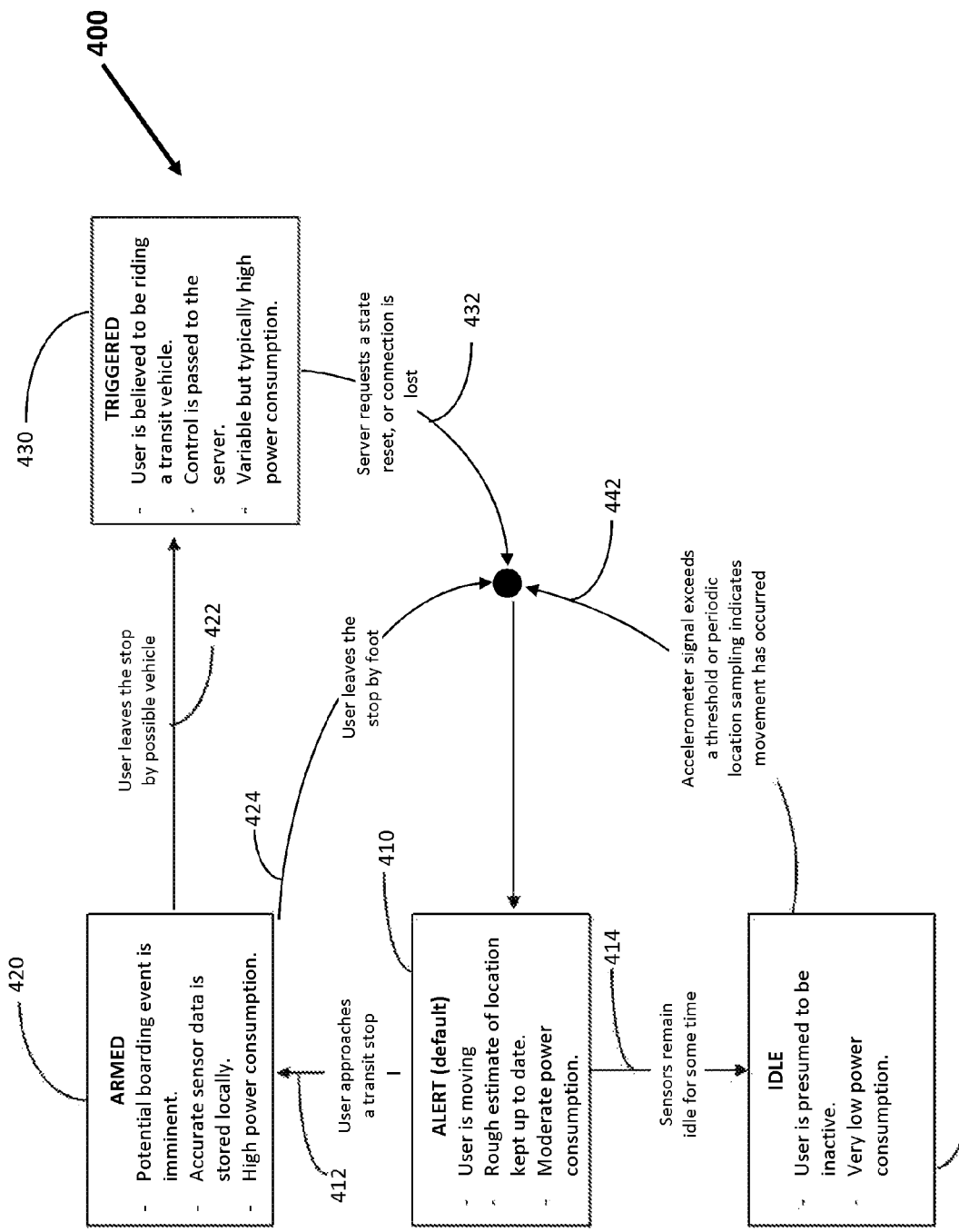
FIG. 4 is a state diagram illustrating transition between a number of monitoring states.
Figure 5:
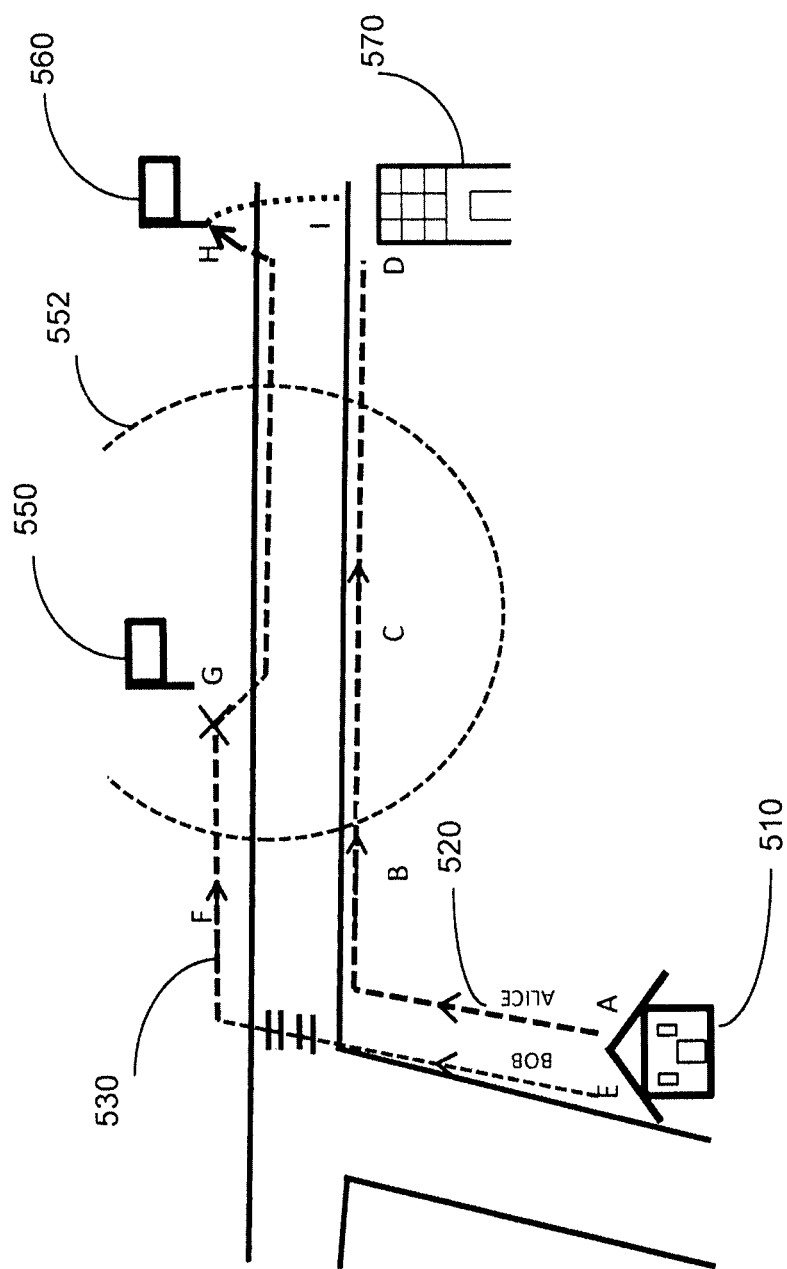
FIG. 5 is a schematic diagram illustrating an example of transition between monitoring states.
Figure 6:
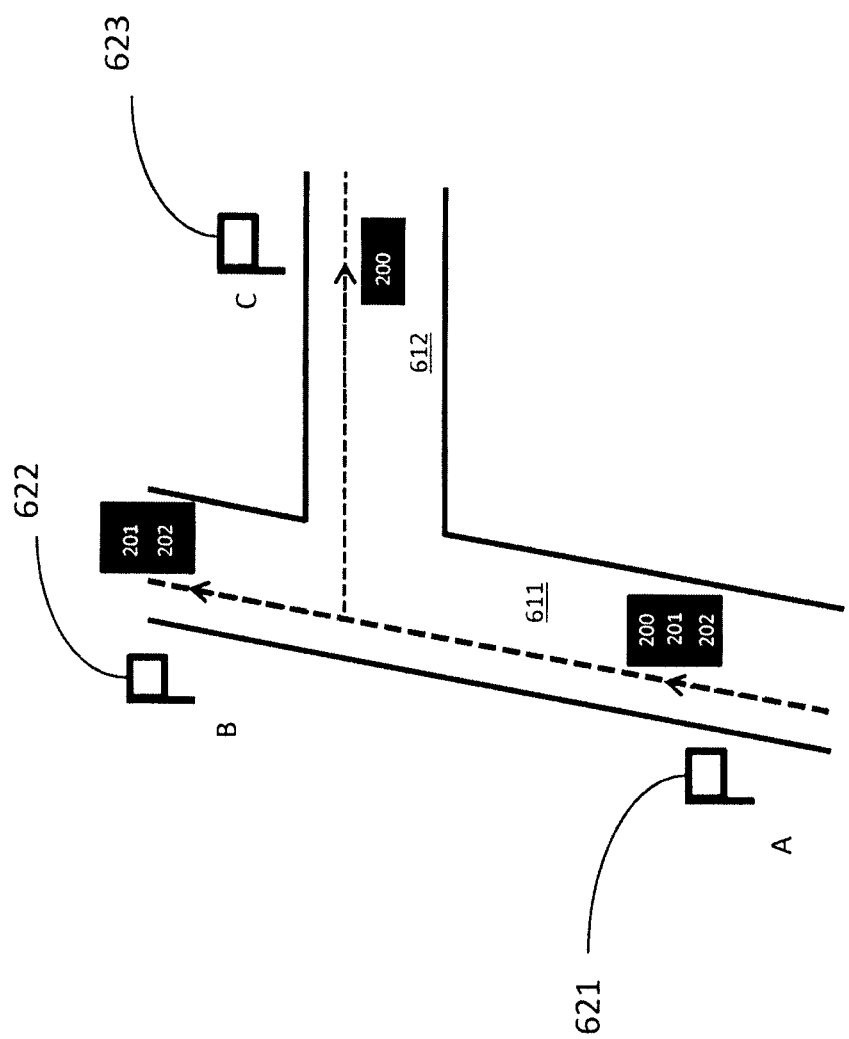
FIG. 6 is a schematic diagram illustrating an example of determining a transport service being used by a user.

The monitoring states specified by monitoring rules 221 controls the data gathered by data monitor 211. An example of monitoring states of an embodiment shown in FIG. 4 are:

IDLE—the lowest state in which the user is presumed to be inactive and accurate location samples are taken infrequently, perhaps once an hour. Note that in this state the accelerometer 230 will likely be polled much more frequently to detect movement, since it takes much less power than more accurate location techniques. In some embodiments there is no communication between the remote monitoring system and the user device in the IDLE state. In one embodiment the accelerometer only is monitored in the IDLE to detect movement of the phone and cause a transition to a higher level state, for example the ALERT state. In this embodiment there is no need to integrate accelerometer data into a meaningful location as the monitoring is simply for movement of the phone being initiated, and location is monitored in another state.

In an alternative embodiment location may be determined in the IDLE state based on dead reckoning alone (using the accelerometer and digital compass only) until a triggering event occurs. The triggering event may be detected by the triggering event monitor and cause a change of state from the IDLE state to a higher state, such as the ALERT state described below. Some examples of triggering events are: moving outside a given range (indicative of leaving a building); moving into a given range of a transit stop; occurrence in the accelerator output of one or more movement signatures indicative of a movement of interest such as walking or running; or expiration of a time period beyond which dead reckoning becomes unreliable, to enable reestablishment of a more accurate position using an alternative technique. Transition from the IDLE state can be triggered by the trigger event determiner once a threshold event occurs.

Transition from the IDLE state can also occur in response to a user action such as opening a transit application.

ALERT—an intermediate state in which location samples are taken more often, perhaps once every 2-5 minutes, using a location technique other than dead reckoning. For example, a communication network based location technique using the communication interface transceiver 251 or WiFi 253 modules such as cell or WiFi location, or using the GPS 240. The data monitor 211 will actively maintain a rough estimate of the user's location using other sensors.

ARMED—a high activity state, where samples are taken using techniques described above for the ALERT state but more frequently perhaps several times a minute and dead reckoning is used to maintain the location estimate between samples. In this state the monitoring state controller 213 is monitoring for a boarding detection process but the data monitor 211 is locally recording signals.

TRIGGERED—a mostly autonomous state, where a connection to the remote monitoring system 110 is opened and signals can be exchanged between the remote monitoring system 110 and the user device 120, to provide device location data to the remote monitoring system 110. The data may be provided in response to discrete requests from the remote monitoring system 110, or streamed at rates requested by the remote monitoring system 110. For example, the remote monitoring system may request a stream of data if the information is considered high priority only, and otherwise poll the device periodically for location data to minimise power consumption. The location information may be considered high priority if there is a user specifically requesting information for the service being used by the user and the user device is the only current source of available data for this service. Where it is determined that two or more users are on the same public transport service the remote monitoring system may poll each device in turn to share the load across all the available devices. Alternatively or additionally the polling rate for the devices may be altered based on urgency or need for the location information. For example if there is no current request form a user for data relating to the service being used, then the remote monitoring system may reduce the polling frequency and only request periodic updates, or may cease to poll the devices. All monitored data can eventually be provided to the remote monitoring system 110, for example stored data may eventually be requested by poll or provided when the user requests information from the system, such as timetables, transit service tracking or trip planning data.

It should be appreciated that the above state description is provided as an example only to show one possible graduation in states and other state definitions are possible with the scope and spirit of the present invention. For example, an embodiment may use only 2 or 3 states or have no discrete states defined but simply vary location determination frequency and accuracy (therefore techniques applied) based on criteria defined in data monitoring rules. For example, increasing or reducing sampling frequency and accuracy maintained based on proximity to a transit stop and identification of boarding/alighting events.

In an embodiment positioning in various states may be performed using a combination of communication network based positioning (for example, Cell and WiFi) and dead reckoning without using GPS. It can be considered inappropriate to switch the GPS unit 240 on while the user is not actively using an application utilising GPS functionality. For example, if the phone's display is off, or the user is using an application other than navigation or transit applications, then the GPS 240 may be turned off. On most phone platforms, users can see if the GPS is enabled and it's considered a potential invasion of privacy to monitor users that closely. An embodiment is therefore envisaged where the GPS sensor is not used or use of the GPS sensor is independent of the state and GPS sensor data is simply utilised if it happens to be available. For example, if the user is actively using the transit application for trip planning or to request schedule information then the GPS 240 may be enabled, as this can improve the user experience and accuracy of data returned. While the GPS is enabled GPS data can be used to supplement the location data acquired using other techniques.

An example state diagram is shown in FIG. 4. In this embodiment the primary indicator of user activity is the phone's accelerometer. The client defaults to the ALERT state 410. In this state 410, a balanced trade-off is maintained between accuracy of location and power consumption.

If the accelerometer on the phone indicates that the phone is stationary (e.g., if there is a constant 1 g signal) for some period of time 414 then the monitoring state controller causes the data monitor to enter IDLE mode 440. The client will reawaken to the ALERT state 410 if the signal from the accelerometer meets some threshold indicating the device is on the move 442.

If a user is determined to approach a known stop 412, the monitoring state controller 213 causes the data monitor 211 to enter ARMED mode 420. That is, the monitoring state controller 213 compares the users location to the previously downloaded information about transport boarding locations (such as bus stops or train stations) within a defined proximity of the user. At this point, the client "suspects" the user might be about to board a transport service. Accordingly, the portable electronic device 110 is closely monitored for movement away from the stop. If movement is determined to be by foot 424, the device 120 reverts to the ALERT state 410. Optionally the client application may also use departure information to improve the confidence in identification of boarding events. For example, if the departure information indicates that a bus is due around the time a possible boarding event movement signature is detected then the client application may infer with higher confidence that the user has boarded the bus, whereas if no bus is scheduled but a boarding event movement signature is detected (for example the user has hailed and boarded a taxi from the bus stop) there may be lower confidence in this event identification. The departure information may be obtained from timetable data stored in memory 220 or the client application may open communication with the remote monitoring system 110 in the ARMED state for passing departure information (static or real time) to the client application. In other embodiments schedule information may be used to trigger a transition from an ALARMED state back to an ALERT state if the schedule information indicates that a boarding event is unlikely or unlikely for some time, for example where a user approached a bus stop at 3 am and no buses are scheduled between 1 am and 5 am. Alternatively if the next train is due to arrive in 20 minutes then the client application may transition to the ALERT state to conserve power for a period of 15 minutes before reverting to the ALARMED state 5 minutes before the scheduled train to monitor for a boarding event.

If a trigger indicative of a boarding event is found 422, the client enters the TRIGGERED state 430. In this state, a connection is opened to the remote monitoring system 110 and any locally stored samples 222C are offloaded. While in this state, the remote monitoring system 120 may control the signal sample frequency of the phone's sensors by way of the monitoring modifier 212. The device 110 will remain in this state until the connection to the central server is lost, or the remote monitoring system 120 instructs the device 120 to change state 432.

The remote monitoring system 110 might request variations to the sample rate in response to a number of conditions. For example:

Another user is interested in the location of the transport service that the remote monitoring system 110 has inferred this user is riding; or The user is entering a section of high or low predictability (a long stretch of highway might be more predictable than the streets of a CBD).

In some embodiments, the sample rate prescribed by the current state can be tuned by the monitoring modifier 212 with a number of other factors including aspects of user behaviour or other inputs to the portable electronic device 120, for example:

User profile: if a user is known to frequent a particular stop, or travel at a certain time, then it may take more samples around that stop or time.

Stop profile: if it's known that users tend to congregate in the vicinity of a bus stop, but rarely board transit services (consider a minor stop near a popular meeting point), then the sample rate might be limited.

Current user activity: if the user has opened the application to check the timetable recently, then the sampling rate might increase on the assumption that they are looking for a transport service to catch.

Monitoring modifier 212 might look for other applications that the user typically runs immediately before catching a bus (a game, perhaps).

In the ARMED state the phone 120 closely monitors the sensors waiting for evidence that the user is leaving the stop. Signals from the sensors 230, 235, 240, 251, 253 are analysed to determine the likely mode by which the user has left the stop and in particular whether a trigger event has occurred. For example:

As the user leaves the transport stop, the accelerometer 230 will likely either have a noisy profile indicating walking, or be much smoother indicating vehicular transport and accelerometer output comparer 213B can compare the output to defined movement profiles 223.

The user's velocity will also give an indication of the mode of transport. There might be an increased "error radius" as the user boards a vehicle. For some modes of transport (buses in particular), the accelerometer 230 may show an isolated positive vertical spike with a corresponding negative spike soon after as the user steps up into the vehicle. The accelerometer may then indicate horizontal movement as the vehicle moves and the acceleration and speed may give an indication of the type of transport.

If the phone 120 display was active, then many users will turn their phone off immediately before boarding a vehicle.

Sometimes, rather than being stationary immediately before boarding, a user will run, which will be detectable with a highly variable accelerometer 230 and increased velocity before boarding.

Using signals such as these, the monitoring state controller 213 decides how the user is travelling:

If the monitoring state controller 213 thinks the user is travelling by foot, then it reverts to ALERT mode.

If the monitoring state controller 213 thinks the user is travelling in a vehicle, then trigger event determiner 213A causes the device 120 to enter TRIGGERED mode.

It's possible for the monitoring state controller 213 to revert to the IDLE state from here if the user isn't moving for long enough.

When a user's phone 120 detects a possible boarding event it will notify the remote monitoring system 110 and provide ongoing access to samples from the phone's sensor 230, 235, 240, 251, 253.

Most importantly, the remote monitoring system 110 will see the time and location of the possible boarding event.

While the user is believed to be on a service, the remote monitoring system 110 will identify 311 and maintain a list of candidate transport services 323 that the user might be riding. Transport services in the list will be sorted by a likelihood score generated by likelihood assigner and updater 312, which will be maintained as the user's journey progresses.

The likelihood score is calculated using a number of criteria depending on what data is available. For example:

Real-time vehicle location data provided by the transit operator—a transit service will score higher if the remote monitoring system 110 knows a particular transport service was passing the user's stop at the appropriate time.

Transport schedules—a transport service will score higher if it was due to pass the user's stop.

Route profiling—static schedules might be modified based on historic performance.

Traffic profiling—static schedules might be modified based on recent performance.

Inferred vehicle location—a transport service will score higher if the remote monitoring system 110 has separately inferred that the transit service was passing the user's stop (perhaps the remote monitoring system 110 determined that another user got on near the start of the route) and there is a current candidate in candidate data 323 for the service that matches the new candidate.

User profile 324—a service will score higher if the user frequently catches that service or route.

Sensor signals—a service will score higher if the sensor signals match that of the mode of transport. Users that follow a train line are likely on a train. Users moving at 30 km/hr are unlikely to be on foot. Users that stop at stops along a route are unlikely to be driving. Users with repetitive cycles on their accelerometer are likely walking.

Separate scores for these separate criteria can be calculated, weighted and combined using any similar techniques.

As discussed above, the location data obtained from each user travelling on the transport services can be used to infer which service each user is using. In turn, the location data provided by the users can also be used to determine real time or near to real time locations for each service. This location data can be used to generate or modify schedule data, and improve arrival and trip time estimations. For example, a transit service timetable may be provided by a transit service provider as stored in schedule data 321, this provides the scheduled arrival times at each stop for a service. The transport service monitoring data obtained from the users travelling on the service provides actual location and time data for the services. The schedule updater 313 can compare the scheduled and actual times a service passes the defined stops and modify the schedule data accordingly. For example, if we have a bus location, this can be converted into estimated arrival times at bus stops by looking at when the bus was due at the location (for example, 3 minutes behind schedule), and considering anything known about congestion up ahead (for example, regular traffic flow or congestion reducing expected travelling speed by around 30% for a 5 km stretch). Based on a combination of this information the schedule updater 313 can estimate when the bus will arrive at future stops and apply a temporary modification to the schedule for the bus. This modified schedule data 322 can then be used for estimating future arrival times for the service.

Monitoring data for services travelling along the same route as another service may be used to update schedule information, for example if there is a consistent delay across a number of services this can indicate congestion or a traffic incident that is affecting all services along this route and schedule data be updated accordingly, even though actual location data may not be available for some of these services.

The modified schedule data 322 may be provided to users 120 by the schedule communicator 315, for example in response to a timetable request by the user. The modified schedule data may also be used in conjunction with a trip planning service.

Some embodiments of the system provide trip planning functionality. In such embodiment the remote monitoring system includes a trip planner module 316. The client application for the user device 120 may include a user interface to input trip planning requests, for example enabling the user to enter start and end locations, a desired departure or arrival time and optionally mode of transport preferences/restrictions, which can be sent as a trip plan request to the trip planner module 316 of the remote monitoring system.

The trip planner module 316 applies a trip planning algorithm to schedule data to generate a trip plan. Preferably the schedule data used includes real-time schedule data which may be real time data 140 provided directly from the transit service provider or the modified schedule data 322. The schedule data can be updated as new information becomes available. The trip planning algorithm applied can be a graph search algorithm. The trip planning data 325 stored in memory 320 holds a graph representing both the street network and the transit network which is searched by the trip planner 316. In this graph, vertices represent intersections and transit stops. Edges represent walkable streets and paths, and transit legs (with their corresponding board/alight times). A simple graph search algorithm like Dijkstra's Algorithm could be run on that graph to find the fastest transit itinerary. Other algorithms may also be used that are faster and more complicated, examples of known graphical search algorithms are "A-star", and RAPTOR developed by Microsoft. Real time data updates cause times associated with transit leg edges to be temporarily amended, in turn modifying the behaviour of the search algorithms. The output returned by the trip planner 316 is one or more itineraries defined as a series of walking and transit legs with data such as departure time, arrival time, route number or directions associated with each leg. This itinerary can be provided to the user device 120 for output to the user as a series of instructions for example:

Walk north along Smith Street, departing at 4.22.
Catch the 290 from stop A at 4.38.
Get off at stop B at 5.02.
Walk west along Brown Avenue for 500 m to arrive at your destination at 5.10.

Optionally a map of the route or individual legs may also be displayed. In embodiments of the present invention the reliability of the itinerary and arrival and departure time information can be high due to the use of real time schedule information, particularly if a trip is to be undertaken within a very short period from the trip plan request time.

The itinerary can be stored locally in memory 220 of the user device 120 to enable the user to refer to the itinerary without needing to resend the request. However, it can be problematic once an itinerary is sent to a user if the real time information changes, for example if a traffic incident occurs along the planned route.

In an embodiment of the system trip planning information is separated into two components, the first component is a template itinerary or itinerary summary indicating the planned route and the second component is timing information which can be updated based on real time schedule information. For example, the template itinerary may be:

Walk north along Smith Street, to bus stop A.
Catch the 290 from stop A.
Get off at stop B.
Walk west along Brown Avenue for 500 m to arrive at your destination.

Information sent with the template itinerary may also include details such as the walk distance and estimated walking time for walking legs. The timing details of when the 290 travels between stops A and B is provided independent of the template itinerary. The client application on the phone can calculate and display the timing information based on the timing details for bus 290 and walking time estimates (i.e. work out when to start walking and when to arrive.

The timing information can be updated, if necessary, based on real time schedule data updates provided by the remote monitoring system. For example, if the 290 bus is due at stop A in 10 minutes when the itinerary is first sent then 5 minutes later real time location data indicates that the bus is delayed by 3 minutes, the trip planner 316 may determine this delay effects a requested trip plan and forward the updated schedule data to the user device, the client application can then update the displayed trip plan accordingly. By keeping track of which timings have been sent to which devices, updates can be sent directly to the relevant phones to ensure their itineraries are as up-to-date as possible. The client application on the phone can alert the user and/or request a new itinerary from the server if an itinerary becomes impossible (one late-running bus might no longer connect up with another bus in a given itinerary).

In some embodiments a user may be able to specify a period of time they are interested in for the purpose of trip planning, for example a two hour window, 3 days, a week, two weeks, or even indefinitely etc. The user may also specify more than one trip of interest for this period, for define a multiple stops trip. The trip planner 316 can determine one or multiple template itineraries as necessary to fulfil the request and initially provide timing data based on schedule data (and may include relevant real time data if available) and periodically provide updated timing data based on the current time or updated of real time data may be triggered when the user opens an itinerary for viewing. In this manner the user can effectively define an expiry time for their itinerary, and does not have to re-request a trip plan each time they wish to view an often used trip. This also enables a user to pre-request trips, for example a tourist may request trip plans based on places of interest they wish to visit the following day and simply open the application to follow the pre-requested trip plan updated with current real time information, rather than having to request trips throughout the day. A person may store their weekday commute trip plan to enable them to easily view this trip with current information at any time.

Persons skilled in the art will appreciate from the above that the names of the various monitoring state are arbitrary and, in the claims that follow, the names are numbered in order to match the order in which they are introduced in the claims. Persons skilled in the art will also appreciate that there are possible alternative server configurations. For example, it is well known in the art to provide more than one server in order to provide an element of load balancing and for an application server to be used in order to direct users to an available server. Such servers are usually able to integrate data so it can be shared when needed, for example, in a back end database.

EXAMPLE 1

Alice wakes up early, and decides to walk to work from home 510 along route 520. Before she leaves home 510 at point A on route 520, the client state is IDLE. As she leaves, she picks up her phone, which puts it into the ALERT state. The phone notices her getting close to the stop 550 at point B on route 520 because she is within perimeter 552, and enters the ARMED state. As she continues walking, the phone realises that she's no longer walking toward the stop at point C on route 520, so reverts to the ALERT state. At work 570 (point D on route 520), the phone will tend to swap between IDLE and ALERT.

Bob gets up on time. The client state is IDLE. He checks his mail on his phone before getting ready for work, causing the phone to swap between IDLE and ALERT. As he leaves the house 510 at point E on route 530, the phone enters the ALERT state. The phone notices him getting close the stop at point F on route 530 (again based on perimeter 552), so enters the ARMED state. He waits at the bus stop 550 a few minutes, before getting on a bus at point G on route 530. The phone notices the sudden change in velocity, so enters the TRIGGERED state. Soon after getting off the bus at stop 560 (point H on route 530) near work 570, the central server requests the phone to revert to the ALERT state. After arriving at Work 570 (at point I on route 530), Bob's phone enters the IDLE state.

Some days, Bob gets to the bus-stop 550, realises that he's missed his bus, so walks instead. After getting a short distance from the bus stop, the phone realises he's walking, and reverts to ALERT mode.

EXAMPLE 2

Examples 2 and 3 are treated as if they have occurred in isolation on different days, so no assumptions can be made about which buses have already departed in Example 2. It is also assumed that there is no real-time location data available from the provider and that scoring is based on times at which the buses are due as set out in Table 1.

TABLE 1

| Stop A | |
|---|---|
| 201 | 7:03 am |
| 200 | 7:05 am |
| 202 | 7:14 am |
| Stop B | |
| 201 | 7:11 am |
| 202 | 7:19 am |
| Stop C | |
| 200 | 7:10 am |

In each scenario, the central server assumes that all trips are potential candidates. Trips occurring much earlier or later in the day have been removed from the example timetables as they will be immediately trimmed when identifying candidate transit services.

For simplicity, only location and timing information are used as criteria and candidates are scored based on the formula:

$$\frac{1}{1 + |t_{current} - t_{due}|}.$$

In practice, a more complex formula might be used, for example to score early transit services harder than late services.

A user boards a 200 bus service leaving Stop A 621 at 7:04 am.

The central server considers each of the candidates:
Bus 200: Time difference is −1, score is $$\frac{1}{1+1} = 0.50.$$

Bus 201: Time difference is +1, score is $$\frac{1}{1+1} = 0.50.$$

Bus 202: Time difference is −10, score is $$\frac{1}{1+10} = 0.09.$$

At this point, the system decides that it's equally likely the user is on either a 200 or 201 service.

When the bus turns right, it will trim 201 and 202 from its list of candidate transit services, which will give 200 the highest score. The bus stops at Stop C 623 at 7:12 (delta 2 minutes), adding 0.5 to the score. The score will continue to increase as it stops at more stops.

EXAMPLE 3

A user boards a 202 service from Stop A 621 at 7:10. Just after boarding, the central server considers each of the candidates:
Bus 200: Time difference is +7; score=0.13
Bus 201: Time difference is +5; score=0.17
Bus 202: Time difference is −4; score=0.20

In this case, the system correctly, but weakly, assumes that the user is on a 202 service. When the bus arrives at Stop B 622, the driver realises they are running early, and waits until 7:19 before continuing. As the bus departs, the scores are increased as follows:
Bus 201: Time difference is +8; score=0.17+0.11=0.28
Bus 202: Time difference is 0; score=0.20+1.00=1.20

By bringing the bus closer to schedule, the score has increased considerably.

Further aspects of the method will be apparent from the above description of the system. It will be appreciated that at least part of the method will be implemented electronically, for example, digitally by a processor executing program code. In this respect, in the above description certain steps are described as being carried out by a processor, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

Herein the term "processor" is used to refer generically to any device that can process instructions and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor, for example, an application specific integrated circuit (ASIC) or a field programmable gate array (FPGA).

It will be understood to persons skilled in the art of the invention that many modifications may be made without departing from the spirit and scope of the invention, in particular it will be apparent that certain features of embodiments of the invention can be employed to form further embodiments and that not all embodiments need to address all disadvantages of the prior art or provide all advantages of the present invention.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic monitoring method for monitoring one or more transport services, comprising:
   for each one of one or more portable electronic devices:
   monitoring data of the portable electronic device indicative of the location of the portable electronic device and storing the location data in a memory of the portable electronic device;
   monitoring for a boarding trigger event indicative of a user carrying the portable electronic device boarding a transport service; and
   upon a boarding trigger event occurring, communicating monitoring data to a remote monitoring system, the monitoring data including at least time data of the boarding trigger event and data indicative of the location of the portable electronic device, wherein monitoring data is communicated by the portable electronic device in response to a request from the remote monitoring system;

identifying a transport service boarded by a user by the remote monitoring system performing the steps of:

identifying, in response to a portable electronic device communicating data indicating a triggering event, a plurality of candidate transport services based on the location and time data for the triggering event and assigning a likelihood score to each candidate transport service;

receiving additional monitoring data from the portable electronic device;

updating the likelihood score of each candidate transport service based on the additional monitoring data; and monitoring one or more transport services by the remote monitoring system using data communicated by each portable electronic device.

2. The method as claimed in claim 1, further comprising inferring the location of one transport services based on data communicated by portable electronic devices identified as being on the transport services.

3. The method as claimed in claim 2, further comprising generating transport schedule data at the remote monitoring system based on the communicated monitoring data by performing the steps of:

comparing the inferred location of a transport service with transport service schedule data; and modifying the transport service schedule data based on any difference between the transport service schedule data and inferred location data to produce modified schedule data.

4. The method as claimed in claim 3, wherein the modified schedule data is further modified to take into account any known real time location data and any relevant known traffic conditions effects.

5. The method as claimed in claim 1, further comprising generating the likelihood score based on at least one of:

a published schedule;

a modified schedule based on performance of the transport service relative to the published schedule; and real-time transport service location data.

6. The method as claimed in claim 5, further comprising generating the likelihood score based on any one or more of:

a location of the transport service inferred from monitoring data obtained from another portable electronic device of another user;

a user profile corresponding to the user of the electronic device; and comparing at least one sensor signal of the portable electronic device to a movement profile for each candidate transport service.

7. The method as claimed in claim 1, further comprising the steps of:

providing trip planning information by the remote monitoring system in response to a trip plan request from a user, wherein the trip planning information comprises template itinerary data and trip timing data which is applied to the template itinerary data to provide a complete trip plan; and updating the trip timing data based on real time data.

8. The method as claimed in claim 1, wherein the step of monitoring for a boarding trigger event includes inferring a boarding event using the steps of:

comparing an output signal from an accelerometer of a portable electronic device with at least two movement profiles, one of the movement profiles corresponding to a user movement profile and another of the movement profiles corresponding to a form of transport available at the boarding location; and upon the output signal matching a movement profile of a form of transport, communicating data indicative of a boarding event having occurred to a remote monitoring system.

9. The method as claimed in claim 8, wherein monitoring for a broader trigger event further comprises any one or more of:

determining whether the user input to the portable electronic device prior to the candidate boarding event is indicative of a boarding event; and comparing the output signal of the accelerometer prior to the candidate boarding event to at least one user movement profile.

10. The method as claimed in claim 1, wherein each portable electronic device is configured to monitor for a boarding trigger event in a first monitoring state in which monitoring data is stored in memory of the portable electronic device, and upon a boarding trigger event occurring, entering a second monitoring state in which data is communicated to a remote monitoring system.

11. The method as claimed in claim 10, further comprising passing control of data monitoring at the portable electronic device to the remote monitoring system upon the boarding trigger event occurring so that data monitoring in the second monitoring state is performed under the control of the remote monitoring system.

12. The method as claimed in claim 10, further comprising monitoring data in an third monitoring state when a default monitoring condition is met, data indicative of the location of the portable electronic device being sampled less frequently in the third monitoring state than in the first monitoring state and stored in the memory of the portable electronic device.

13. The method as claimed in claim 12, further comprising:

comparing the location data to location data of one or more transport boarding locations; and upon a proximity condition being satisfied with respect to the one or more transport boarding locations, transitioning to the first monitoring state.

14. The method as claimed in claim 12, further comprising transitioning to a fourth monitoring state responsive to determining that the portable electronic device has been stationary for a time period.

15. The method as claimed in claim 1, further comprising altering a sampling rate responsive to a determined user behaviour, wherein the user behaviour comprises any one or more of:

a current user activity determined based on the user's interaction with the portable electronic device;

a past user activity based on one or more past travel events of the user; and a past user activity based on one or more past behaviours of a plurality of users.

16. A monitoring system for monitoring one or more transport services comprising:

a remote monitoring system; and at least one portable electronic device arranged to:

monitor data in an first monitoring state in which data of a portable electronic device indicative of the location of the portable electronic device is stored in a memory of the portable electronic device;

monitor for a boarding trigger event indicative of the user boarding a transport service; and upon a boarding trigger event occurring, enter a second monitoring state in which data indicative of the location of the portable electronic device is communicated to the remote monitoring system, the monitoring data including at least time data of the boarding trigger event and data indicative of the location of the portable electronic device, wherein monitoring data is communicated by the portable electronic device in response to a request from the remote monitoring system, wherein the remote monitoring system is arranged to:

request monitoring data from the at least one portable electronic device;

receive monitoring data from a portable electronic device, the monitoring data including at least location and time data of a boarding event detected by the portable electronic device, the boarding event being indicative of the user boarding a transport service;

identify a plurality of candidate transport services based on the location and time data and assigning a likelihood score to each candidate transport service;

receive additional monitoring data from the portable electronic device;

update the likelihood score of each candidate transport service based on the additional monitoring data, and monitoring one or more transport services by the remote monitoring system using data communicated by each portable electronic device.

* * * * *